United States Patent
Koike

(10) Patent No.: US 6,177,207 B1
(45) Date of Patent: Jan. 23, 2001

(54) COMBINATION READ/WRITE THIN FILM MAGNETIC HEAD AND ITS MANUFACTURING METHOD

(75) Inventor: Fumihito Koike, Niigata-ken (JP)

(73) Assignee: Alps Electric Co., Ltd. (JP)

( * ) Notice: Under 35 U.S.C. 154(b), the term of this patent shall be extended for 0 days.

(21) Appl. No.: 09/154,308

(22) Filed: Sep. 16, 1998

(30) Foreign Application Priority Data

Sep. 17, 1997 (JP) .................................................. 9-251866

(51) Int. Cl.⁷ ...................................................... G11B 5/66
(52) U.S. Cl. .............. 428/692; 428/694 R; 428/694 TR; 428/694 T; 428/694 TS; 428/694 TM; 428/900; 360/113; 324/252
(58) Field of Search ................................ 428/692, 694 R, 428/694 TR, 694 T, 694 TS, 694 TM, 900; 360/113; 324/252

(56) References Cited

U.S. PATENT DOCUMENTS

| | | | |
|---|---|---|---|
| 3,908,194 | 9/1975 | Romankiw | 360/317 |
| 4,447,839 | 5/1984 | Desserre et al. | 360/319 |
| 5,549,978 | * 8/1996 | Iwasaki | 428/692 |
| 5,750,273 | * 5/1998 | Inowe | 428/692 |

* cited by examiner

Primary Examiner—Leszek Kiliman
(74) Attorney, Agent, or Firm—Brinks Hofer Gilson & Lione

(57) ABSTRACT

The bottom core layer is formed into a double-layer structure in which the first bottom core layer and the second bottom core layer containing Co as a principal component are formed of soft magnetic films mainly constructed by an amorphous structure. The second bottom core layer has a higher Co concentration than the Co concentration of the first bottom core layer, making it possible to improve the core function of the second bottom core layer along with improving the shield function of the first bottom core layer.

64 Claims, 6 Drawing Sheets

COMBINATION READ/WRITE THIN FILM MAGNETIC HEAD AND ITS MANUFACTURING METHOD

BACKGROUND OF THE INVENTION

1. Field of the Invention

The present invention relates to a MR/inductive type combination read/write thin film magnetic head to be mounted on the hard disk device, especially to a thin film magnetic head improved in both of the core function and shield function, and its manufacturing method.

2. Description of the Related Art

FIG. 10 is an enlarged cross section of the conventional thin film magnetic head viewed from the confronting side of the recording medium.

This thin film magnetic head belongs to a so called MR (magnetoresistance)/inductive type combination thin film magnetic head in which a reading head h1 making use of a magnetoresistance effect and a writing inductive head h2 are layered on the trailing side end face of a slider constituting a floating type magnetic head.

The reading head h1 is composed of a bottom gap layer 2 made of a non-magnetic material such as $Al_2O_3$ (aluminum oxide) formed on a bottom shield layer 1 made of Sendust or a Ni—Fe alloy (permalloy), on which a magnetoresistive element layer 3 is formed. The magnetoresistive element layer 3 is composed of three layers of a soft magnetic layer (Soft Adjacent Layer: SAL), a non-magnetic layer (SHUNT layer) and a magnetoresistive layer (MR layer) from the bottom to the top. The magnetoresistive element layer and the non-magnetic layer are usually composed of a layer of a Ni—Fe alloy (permalloy) and a Ta (tantalum) layer, respectively, while the soft magnetic layer is formed of a Ni—Fe—Nb alloy.

Hard bias layers 4 are formed on both sides of the magnetoresistive element layer 3 as longitudinal bias layers. A main electrode layer 5 made of a material having a small electric resistance such as Cu (copper) and W (tungsten) is formed on the hard bias layers 4, a top gap layer 6 made of a non-magnetic material such as alumina being additionally formed thereon.

A bottom core layer 20 is formed on the top gap layer 6 by plating with, for example, permalloy. This bottom core layer 20 serves as a leading side core part at the inductive head h2 where the bottom core layer 20 imparts recording magnetic field to the recording medium while serving as a top shield layer at the reading head h1. The gap width G11 is determined by the gap between the bottom shield layer 1 and bottom core layer 20.

A gap layer (a layer of a non-magnetic material) 9 formed of alumina (aluminum oxide) and an insulation layer (not shown) made of polyimide or a resist material are layered on the bottom core layer 20, and a coil layer 10 patterned to form a spiral shape is provided on the insulation layer. The coil layer 10 is formed of a non-magnetic conductive material having a small electric resistance such as Cu (copper). The coil layer 10 is also surrounded by an insulation layer (not shown) made of polyimide or a resist material, a top core layer 11 formed of a magnetic material such as permalloy being plated on the insulation layer. The top core layer 11 serves as a trailing side core part of the inductive head h2 for imparting recording magnetic field to the recording medium.

The top core layer 11 is faced on the bottom core layer 20 at the confronting side of the recording medium via the gap layer 9 as shown in the drawing, forming a magnetic gap of the magnetic gap length G12 that imparts recording magnetic field to the recording medium. A protective layer 12 made of, for example, alumina is provided on the top core layer 11.

Recording electric current flows through the coil layer 10 at the inductive head h2 to impart recording magnetic field from the coil layer 10 to the top core layer 11 and bottom core layer 20. Magnetic signals are recorded on the recording medium such as a hard disk with leakage magnetic filed between the bottom core layer 20 and top core layer 11 at the magnetic gap part.

Since the bottom core layer 20 serves not only as a reading side core of the inductive head h2 but also as a top shield layer of the reading head h2 in the thin film magnetic head shown in FIG. 10 as described above, the bottom core layer 20 is required to have both properties of as a core and as a shield.

TABLE 1 below indicates magnetic characteristics required for the core function and shield function, and magnetic characteristics of the Ni—Fe alloy (permalloy) conventionally used as the bottom core layer 20.

TABLE 1

|  | High Bs | Low Hc | High Hk | High $\mu$ | High $\rho$ | Low $\lambda$ | Low $\sigma$ |
|---|---|---|---|---|---|---|---|
| Core function | ⊚ | Δ | ○ | Δ | ⊚ | Δ | ○ |
| Shield function | Δ | ○ | Δ | ⊚ | ○ | ⊚ | ○ |
| Ni—Fe alloy | 1.0 (T) | <0.5 (Oe) | 3–4 (Oe) | 2000 | 18 ($\mu\Omega \cdot cm$) | $-5 \times 10^{-7}$ | <100 (MPa) |

In TABLE 1, the mark ⊚ denotes an especially required magnetic characteristic, the mark ○ denotes a magnetic characteristic required next to ⊚ and the mark A denotes a magnetic characteristic that may have an appropriate value.

It is evident that a high saturation magnetic flux density (Bs) is first of all required in order to improve the core function of the bottom core layer 20 as shown in TABLE 1. While the track width should be narrowed responding to high recording density, a problem of write fringing will occur to deteriorate the recording characteristic when the saturation magnetic flux density is low.

The resistivity ($\rho$) should be also made high because eddy current loss is increased at high frequency bands when the resistivity is low along with causing a problem of phase retardation (non-linear transition shift: NLTS) of the recording magnetic field due to the eddy current loss.

Anisotropic magnetic field (Hk) should be as high as possible in order to properly align magnetization along the track width direction by annealing in the magnetic field, thereby making the direction of the external magnetic field from the recording medium to be a hard axis of magnetization. A favorable magnetic inversion during recording can be attained by allowing magnetization to be properly aligned along the track width direction.

Stress (σ) should be low to a certain extent for improving adhesive property.

A high magnetic permeability (μ) is first of all required for improving the shield function of the bottom core layer 20. Higher magnetic permeability enables excess signals (noises) from the recording medium to be absorbed by the bottom core layer 20, making it possible to properly operate the MR layer.

Magnetostriction constant (λ) should be also low. The magnetic domain structure of the bottom core layer 20 is stabilized along with enabling to enhance the magnetic permeability (μ) by lowering the magnetostriction constant.

It is preferable that resistivity (ρ) is high in order to suppress eddy current at high frequency bands from generating. It is also preferable that stress (σ) and coercive force (Hc) are substantially low.

The saturation magnetic flux density (Bs) is not required to be so high for improving the shield function of the bottom core layer 20 as will be evident from TABLE 1, because the signal level from the recording medium is so small that magnetic saturation by the signals from the recording medium is hardly attained even when the saturation magnetic flux density is relatively small.

Although the anisotropic magnetic field (Hk) is not required to be so high, a level of at least 1 Oe (oersted) or more is necessary. When the anisotropic magnetic field (Hk) is less than 1 Oe, the magnetic field is considered to be substantially isotropic, so that magnetization can not be aligned along the track width direction even when the core is annealed in the magnetic field.

When the anisotropic magnetic field (Hk) is too high, on the other hand, the magnetic permeability (μ) is decreased thereby deteriorating the shield function because there is a relation as shown below between the magnetic permeability (μ) and anisotropic magnetic field (Hk):

μ=saturation magnetic flux density (Bs)/anisotropic magnetic field (Hk)

An eddy current is generated in the bottom core layer 20 at a high recording frequency to increase heat loss due to the eddy current when the bottom core layer 20 is formed of the Ni—Fe alloy, because resistivity (ρ) of the Ni—Fe alloy is suppressed very low as shown in TABLE 1.

While the anisotropic magnetic field (Hk) of the Ni—Fe alloy is 3 to 4 Oe (oersted) as shown in TABLE 1, a higher anisotropic magnetic field (Hk) is required for the core function of the bottom core layer 20. Although the core function would be improved provided that the anisotropic magnetic field (Hk) is high, the shield function will be rather deteriorated due to decrease of the magnetic permeability (μ) ascribed to a high anisotropic magnetic field (Hk).

As hitherto described, it is difficult for the structure of the bottom core layer 20 to simultaneously improve both of the core function and shield function of the bottom core layer 20 that is essentially required to have different magnetic characteristics. There are also a problem of low resistivity (ρ) in the Ni—Fe alloy as described above, making it difficult to comply with the requirement of high recording density owing to, for example, increment of heat loss by the eddy current at a high frequency band.

SUMMARY OF THE INVENTION

The object of the present invention for solving the problems in the prior art as described above is to provide a thin film magnetic head being simultaneously improved in both of the core function and shield function of the of the bottom core layer by improving the structure of the bottom core layer and the soft magnetic material to be used in the bottom core layer, and the method for producing the thin film magnetic head.

The present invention provides a thin film magnetic head having a magnetoresistive element layer, an electrode layer for imparting a sensing current to this magnetoresistive element layer, a bottom core layer serving also as a top shield function of a reading head formed on the electrode layer via an insulation layer, a top core layer confronting the bottom core layer at the confronting part of a recording medium via a magnetic gap and a coil layer for imparting a magnetic field to both core layers, the bottom core layer having a double-layer structure of soft magnetic films containing Co as a principal component and mainly composed of an amorphous structure, wherein the upper side bottom core layer of the two layers confronting the top core layer contains a higher concentration of Co than the lower side bottom core layer confronting the magnetoresistive element layer.

In the present invention, the composition formula of the soft magnetic film containing Co as a principal component and mainly composed of an amorphous structure is represented by $Co_a Zr_b Nb_c$, wherein the composition ratio a is in the range of $85 \leq a \leq 91$ when the soft magnetic film is used for the upper side bottom core layer, wherein the composition ratio a is in the range of $78 \leq a \leq 82$ when the soft magnetic film is used for the lower side bottom core layer, and wherein the composition ratios b and c (at. %) are represented by;

b=(0.5 to 0.8)×(100−a) and c=100−a−b in both of the upper side bottom core layer and lower side bottom core layer.

It is preferable in the present invention that the foregoing composition ratio b is represented by b=(0.6 to 0.7)×(100−a).

Hf may be added instead of the element Zr constituting the soft magnetic film, or Ta or Mo may be added instead of the element Nb constituting the soft magnetic film in the present invention. In other words, a Co—Hf—Ta alloy, Co—Zr—Ta alloy and Co—Zr—Mo alloy are possible to be used as the bottom core layer other than the Co—Zr—Nb alloy in the present invention. The composition ratio of the Co—Hf—Ta alloy and the like may be the same as that of the Co—Zr—Nb alloy described above.

The magnetic characteristics of the top and bottom core layers according to the present invention are; the saturation magnetic flux density (Bs) in the range of 1.0 to 1.4 T (tesla), the resistivity (ρ) of 90 μΩ·cm or more and the anisotropic magnetic field (Hk) of 10 Oe (oersted) or more. The magnetic characteristics of the lower side bottom core layer according to the present invention are; the saturation magnetic flux density (Bs) in the range of 0.6 to 0.8 T, the resistivity (ρ) of 120 μΩ·cm or more and the Curie temperature (Tc) of 500° C. or less.

The preferable anisotropic magnetic field (Hk) of the lower side bottom core layer is in the range of 1 to 5 Oe, more preferably in the range of 2 to 3 Oe, in the present invention, through it depends on the heat treatment temperature.

The magnetic permeability (μ) of the lower side bottom core layer is 3000 or more.

The magnetostriction constants (λ) of the upper side bottom core layer and top lower side bottom core layer is $5 \times 10^{-7}$ or less, more preferably $3 \times 10^{-7}$ or less, in their absolute values.

It is preferable in the present invention that the film thickness of the entire bottom core layer as a sum of the film thickness of the upper side bottom core layer and lower side bottom core layer is within the range of 1 to 4 μm, and the film thickness of the upper side bottom core layer occupies 50% to 90% of the film thickness of the entire bottom core layer.

The film thickness of the upper side bottom core layer is made to be larger than the film thickness of the lower side bottom core layer because, since the upper side bottom core layer serves as a recording core, its film thickness is required to be thick to allow magnetization to be hardly saturated.

Magnetization of the upper side bottom core layer and lower side bottom core layer are aligned along the track width direction in the present invention, making the direction of the recording magnetic field toward the recording medium and the direction of the external magnetic field from the recording medium to be a hard axis of magnetization.

The present invention provides a method for producing a thin film magnetic head having a magnetoresistive element layer, an electrode layer for imparting a sensing current to this magnetoresistive element layer, a bottom core layer serving also as a top shield function of a reading head formed on the electrode layer via an insulation layer, a top core layer confronting the bottom core layer at the confronting part of a recording medium via a magnetic gap and a coil layer for imparting a magnetic field to both core layers, comprising the steps of:

forming a first bottom core layer by depositing a soft magnetic film principally containing Co and mainly composed of an amorphous structure on the insulation layer;

forming a second bottom core layer by depositing a soft magnetic film containing a higher concentration of Co than the concentration of Co in the first bottom core layer and mainly composed of an amorphous structure on the first bottom core layer; and applying an annealing treatment to the first and second bottom core layers in a magnetic field at a temperature range of 200° C. to 400° C.

The second (upper side) bottom core layer can be kept high and, conversely, the anisotropic magnetic field (Hk) of the first (lower side) bottom core layer can be made low by keeping the heat treatment temperature in the range of 200° C. to 400° C. in the present invention.

The bottom core layer simultaneously serving as two functions of a core function and shield function is formed into a double-layer structure, endowing the upper side bottom core layer (referred to a second bottom core layer hereinafter) confronting the top core layer with a core function and the lower side bottom core layer (referred to a second core layer hereinafter) confronting the magnetoresistive element layer with a shield function.

While both of the first and second bottom core layers contain Co as a principal component and are formed of a soft magnetic film mainly composed of an amorphous structure, the Co concentration in the second bottom core layer is made to be higher than the Co concentration in the first bottom core layer in order to allow magnetic characteristics required for the first and second bottom core layers to be exhibited.

The saturation magnetic flux density (Bs), resistivity (ρ) and anisotropic magnetic field (Hk) in the second core layer are made higher than those of the conventional Ni—Fe alloy by the construction as described above, making it possible to improve the core function.

On the other hand, magnetic characteristics such as a high magnetic permeability (μ), low magnetostriction constant (λ), high resistivity (ρ) and an appropriate anisotropic magnetic field (Hk) that are required for improving the shield function can be obtained in the first core layer.

DESCRIPTION OF THE PREFERRED EMBODIMENT

Figure 1:
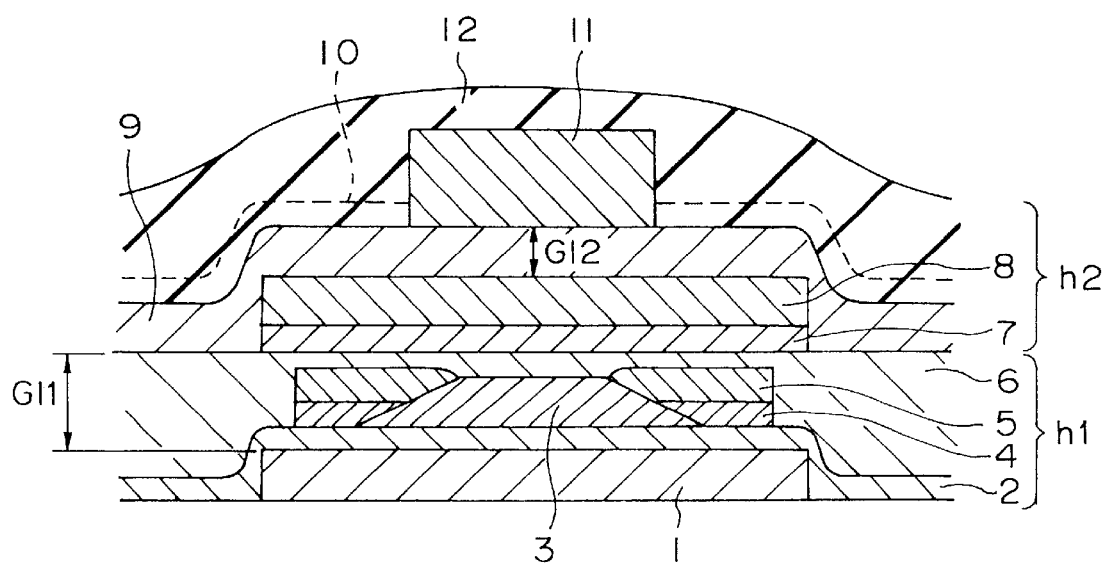
FIG. 1 is an enlarged cross section of the thin film magnetic head exhibiting the construction of the embodiment according to the present invention.
Figure 2:
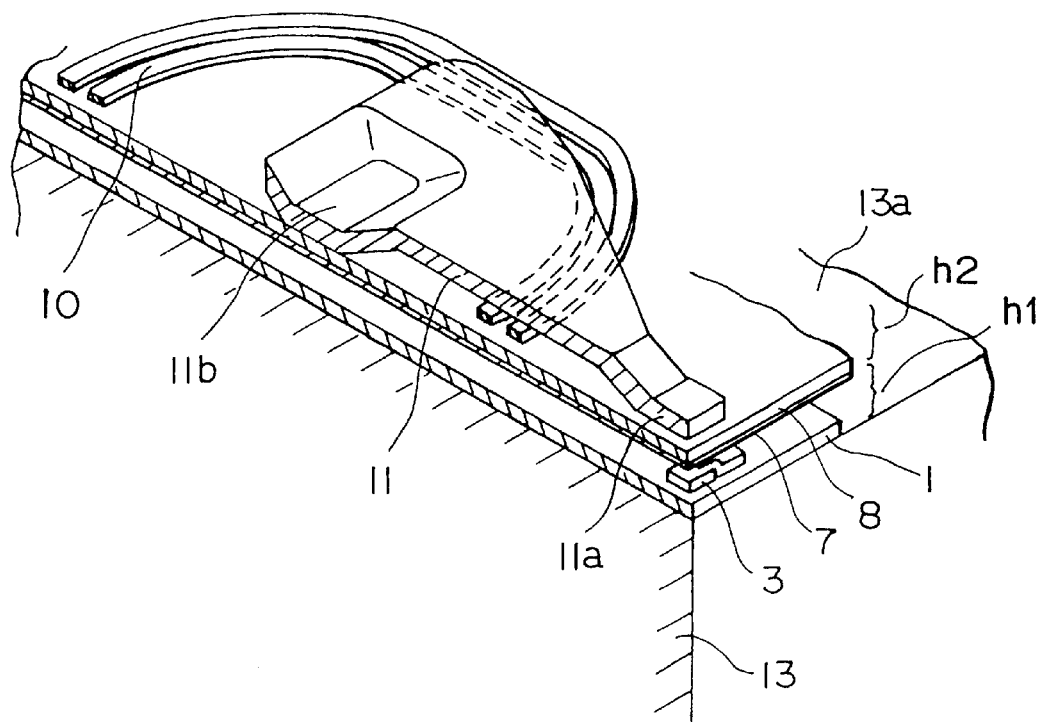
FIG. 2 is a perspective view of the partial half-cross section of the thin film magnetic head formed on a slider.

FIG. 1 shows the thin film magnetic head according to the embodiment of the present invention that is an enlarged cross section viewed from the confronting side of the recording medium. FIG. 2 is a perspective view showing an outline of entire construction of the thin film magnetic head formed on the slider 13.

The thin film magnetic head shown in FIG. 1 and FIG. 2 is formed on the trailing side end face 13a of the slider 13 constructing the floating type head, a reading head h1 and an inductive head h2 being layered thereon.

The reading head h1 is provided to read recording signals by sensing leakage magnetic field from a recording medium such as a hard disk by taking advantage of magnetoresistive effect. As shown in FIG. 2, a bottom shield layer 1 made of a soft magnetic material is formed on the trailing side end face 13a of the slider 13.

A bottom gap layer 2 formed of a non-magnetic material such as $Al_2O_3$ (alumina) is provided on the bottom shield layer 1 as shown in FIG. 1. A magnetoresistive element layer 3 is layered on the bottom gap layer 2. The magnetoresistive element layer 3 has a triple-layer structure being formed of a SAL layer made of soft magnetic material (Co—Fe—Mo alloy or Ni—Fe—Nb alloy), SHUNT made of a non-magnetic material (for example Ta (tantalum)) and a MR layer (Fe—Ni alloy) having a magnetoresistive effect from the bottom to the top. A hard bias layer 4 that imparts a bias magnetic field to the MR layer and an electrode layer 5 (W (tungsten)or Cu (copper)) that imparts a sensing current to the MR layer are formed on both sides of the magnetoresistive element layer 3, a top gap layer 6 being additionally formed thereon. Since the gap length Gl1 is determined by the bottom shield layer 1 and bottom core layer (top shield layer) 7 to be described hereinafter, it is preferable that the bottom gap layer 2 and top gap layer 6 is formed as thin as possible in order to enhance resolution of the leakage field from the recording medium.

As shown in FIG. 1 and FIG. 2, a first (lower) bottom core layer 7 and second (upper) bottom core layer 8 are continuously layered on the top gap layer 6 in the present invention.

The first bottom core layer 7 confronts the magnetoresistive element layer 3 described above via the top gap layer 6, serving as a top shield layer of the reading head h1. The second bottom core layer 8 confronts the top core layer 11 to be described hereinafter via a gap layer 9, serving as a reading side core of the inductive head h2.

It is preferable in the present invention that the film thickness of the entire bottom core layer as a sum of the film thickness of the first bottom core layer 7 and film thickness of the second bottom core layer 8 is about 1 to 4 µm. It is also preferable in the present invention that the film thickness of the second bottom core layer 8 occupies 50% to 90% of the film thickness of the entire bottom core layer.

When the film thickness of the second bottom core layer 8 having a core function is thin, the magnetic field is liable to be saturated because a large amount of magnetic field is generated at the second bottom core layer 8, causing problems such as generation of write fringing magnetic field.

As shown in FIG. 1, a gap layer (a layer of a non-magnetic material) made of, for example, alumina is formed on the second bottom core layer 8, on which a coil layer 10 patterned to form a spiral plane is provided via an insulation layer (not shown) made of polyimide or a resist material. The coil layer 10 is formed of a non-magnetic conductive material such as Cu (copper) having a small electric resistance.

The coil layer 10 is surrounded by an insulation layer (not shown) made of polyimide or a resist material, a top core layer 11 made of a soft magnetic material to serve as a trailing side core part of the inductive head h2 being formed on the insulation layer. As shown in FIG. 2, the tip 11a of the top core layer 11 confronts on the second bottom core layer 8 via the layer 9 of a non-magnetic material to form a magnetic gap of the magnetic gap length G12 for imparting a recording magnetic field to the recording medium. The bottom end part 11b of the top core layer 11 is magnetically connected to the second bottom core layer 8 as shown in FIG. 2. A protective layer 12 made of, for example, alumina is provided on the top core layer 11.

A recording current is imparted to the coil layer 10 at the inductive head h2, the recording magnetic field being induced from the coil layer 10 to the second bottom core layer 8 and top core layer 11. Magnetic signals are recorded on the recording medium such as a hard disk at the magnetic gap length G12 portion by virtue of the leakage magnetic field between the second bottom core layer 8 and the tip 11a of the top core layer 11.

The gap length G12 of the inductive head h2 is formed to be as short as possible so that the magnetic signal can be recorded with a high density on the recording medium such as a hard disk at the inductive head h2.

Since the first bottom core layer 7 serves as a shield while the second bottom core layer 8 serves as a core, the magnetic characteristics required for the first bottom core layer 7 and second bottom core layer 8 should be different with each other.

The magnetic characteristics especially required for the shielding function is a high magnetic permeability ($\mu$) and low magnetostriction constant ($\lambda$).

The magnetic characteristics especially required for the core function is a high saturation magnetic flux density and high resistivity. A high anisotropic magnetic field (Hk) is additionally required for the core function. The high anisotropic magnetic field (Hk) is required for appropriately aligning magnetization along the track width direction, thus allowing the direction of the recording magnetic field toward the recording medium (perpendicular to the printed face in FIG. 1) to be a hard axis of magnetization. It is preferable to allow the magnetic field to be favorably reversed during recording in order to improve the core function. Accordingly, the magnetization direction should be aligned along the track width direction by making the anisotropic magnetic field high as described previously.

Though the anisotropic magnetic field (Hk) of the first bottom core layer 7 that serves as a shield is suppressed low as compared with the anisotropic magnetic field (Hk) of the second bottom core layer 8 considering the relation with the magnetic permeability ($\mu$), the magnetization of the first bottom core layer 7 is favorably aligned along the track width direction under the influence of the high anisotropic magnetic field (Hk) of the second bottom core layer 8.

It is made possible to obtain required magnetic characteristics for respective layers by forming the first bottom core layer 7 and second bottom core layer 8 of a soft magnetic film containing Co as a principal component and mainly composed of an amorphous structure, along with by adjusting the Co concentration of the second bottom core layer 8 higher than the Co concentration of the first bottom core layer 7.

The composition formula of the soft magnetic film containing Co as a principal component and mainly composed of an amorphous structure according to the present invention is represented by $Co_aZr_bNb_c$.

Co is a principal component responsible for magnetization while the magnetostriction constant ($\lambda$) can be decreased by properly controlling the concentrations of Zr and Nb.

The composition ratio a (at. %) of Co is in the range of $85 \leq a \leq 91$ when the soft magnetic film is used for the second bottom core layer 8.

The composition ratio a (at. %) of Co is in the range of $78 \leq a \leq 82$ when the soft magnetic film is used for the first bottom core layer 7.

The composition ratio b (at. %) of Zr and composition ratio c (at. %) of Nb is represented by b=(0.5 to 0.8)×(100−a) and c=100−a−b in both the first bottom core layer 7 and bottom core layer 8.

The composition ratio b is more preferably represented by b=(0.6 to 0.7)×(100−a).

Hf instead of Zr and Ta and Mo instead of Nb may be added in the present invention. In other words, the Co—Hf—Ta alloy, Co—Zr—Ta alloy and Co—Zr—Mo alloy may be used instead of the Co—Zr—Nb alloy in the present invention. A favorable magnetic characteristics as described previously can be obtained when the composition ratio (at. %) of the Co—Hf—Ra alloy and the like is adjusted to the same composition as the Co—Zr—Nb alloy.

The major magnetic characteristics of the first bottom core layer 7 and second bottom core layer 8 are listed in TABLE 2 when the first bottom core layer 7 and second bottom core layer 8 are formed of the Co—Zr—Nb alloy. The magnetic characteristics of the Ni—Fe alloy are also listed in TABLE 2 as comparative examples.

TABLE 2

|  | Bs (T) | Hc (Oe) | Hk (Oe) | μ at 10 MHz | ρ (μΩ·cm) | λ | σ (MPa) |
|---|---|---|---|---|---|---|---|
| Second bottom core | 1.0–1.4 | <0.5 | >10 | 1000 | 90–120 | <±5 × $10^{-7}$ | <100 |
| First bottom core | 0.6–0.8 | <0.5 | 1–5 | >3000 | 120–130 | <±5 × $10^{-7}$ | <100 |
| Ni—Fe alloy | 1.0 | <0.5 | 3–4 | 2000 | 18 | ±5 × $10^{-7}$ | <100 |

The magnetic characteristics of the second bottom core layer 8 having a core function will be described at first. As described above, the Co concentration (at. %) in the second bottom core layer 8 is in the range of 85≦a≦92, which makes it possible to adjust the saturation magnetic flux density to 1.0 to 1.4 T, the coercive fore (Hc) to 0.5 Oe or less and the resistivity (ρ) to 90 to 120 μΩ·cm as shown in TABLE 2. The Curie temperature (Tc) can be also adjusted 600° C. or more, though it is not listed in TABLE 2.

The anisotropic magnetic field (Hk) can be adjusted to 10 Oe or more. The magnetic permeability (μ) is about 1000.

It is not preferable that the Co concentration is 85 at. % or less because the saturation magnetic flux density is too lowered. A Co concentration of 91 at. % or more is not preferable in that the corrosion resistance is decreased, an amorphous structure is hardly formed and crystallization starts. When the film structure is a crystalline phase, the resistivity (ρ) is decreased, causing a problem of generation of an eddy current at high frequency bands besides deteriorated soft magnetic characteristic, high coercive force and low magnetic permeability (μ).

As will be evident from the descriptions above, the saturation magnetic flux density (Bs) of the second bottom core layer 8 that serves as a core can be made high along with allowing the resistivity (ρ) to be higher than that of the Ni—Fe alloy, making it possible to diminish heat loss due to eddy current at high frequency bands and suppressing phase retardation (non-linear transition shift: NLST) due to the eddy current.

It is also possible in the present invention to make the anisotropic magnetic field (Hk) of the second bottom core layer 8 to be sufficiently high. Accordingly, magnetization can be favorably aligned along the track width direction to allow the direction of the recording magnetic field toward the recording medium to be a hard axis of magnetization. Favorable alignment of the magnetization along the track width direction enables the magnetization during recording to be desirably reversed.

Figure 5:
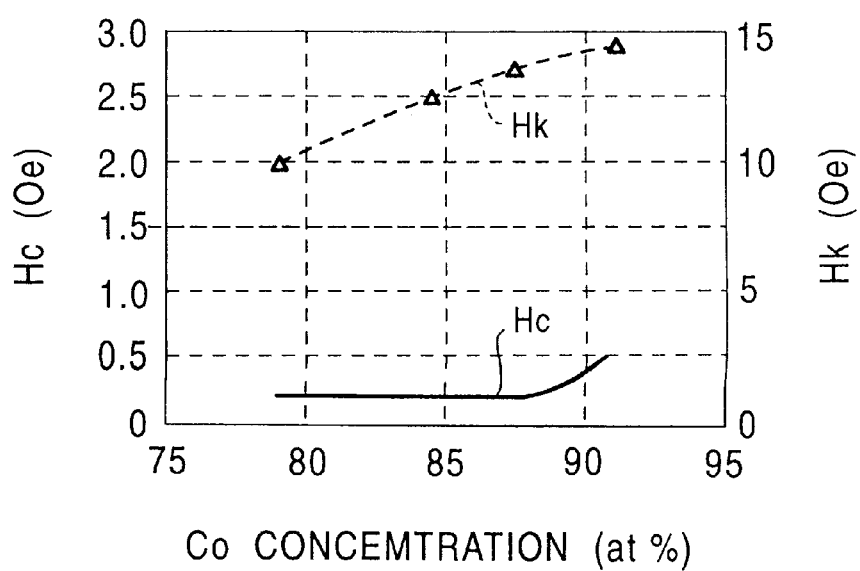
FIG. 5 is a graph showing the relation between the Co concentration (at. %), and coercive force (Hc) and anisotropic magnetic field (Hk).
Figure 6:
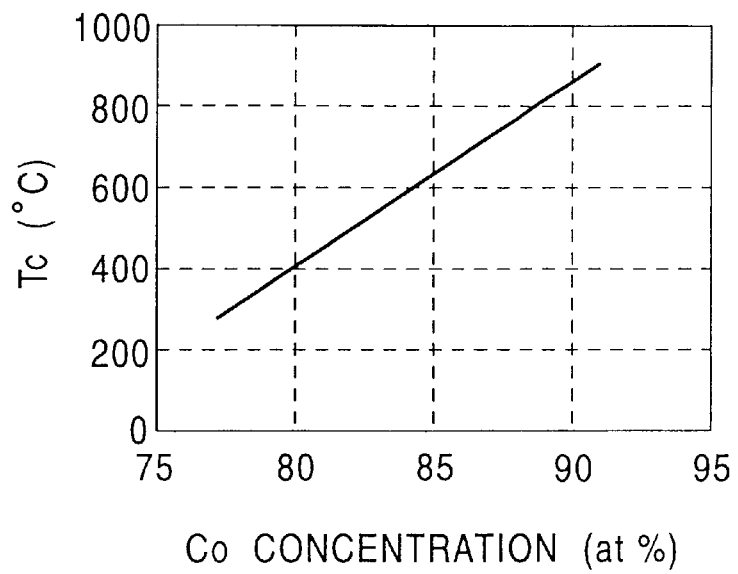
FIG. 6 is a graph showing the relation between the Co concentration (at. %) and Curie temperature (Tc).

The anisotropic magnetic field (Hk) of the second bottom core layer 8 can be made high by the following reasons:

The anisotropic magnetic field (Hk) at the time of deposition (before heat treatment) is about 120 Oe or more since the Co concentration of the second bottom core layer 8 is as high as 85 to 91 at. % (see FIG. 5) while the Curie temperature (Tc) is 600° C. or more (see FIG. 6).

The anisotropic magnetic field (Hk) is gradually decreased with heating (see FIG. 8), reaching to zero at the Curie temperature (Tc). That is, suppose the Curie temperature of the second bottom core layer 8 is 600° C., then subjecting to a heat treatment at 600° C. or more allows the anisotropic magnetic field (Hk) of the second bottom core layer 8 to be zero.

The temperature of the annealing treatment carried out after the deposition is within the range of 200° C. to 400° C. in the present invention as will be described hereinafter. This means that the anisotropic magnetic field (Hk) is hardly decreased at a heat treatment temperature of 200° C. to 400° C. because the Curie temperature is as high as 600° C. or more, enabling the anisotropic magnetic field (Hk) of the second bottom core layer 8 to be maintained at a high value of 10 Oe or more.

The magnetic characteristics of the first bottom core layer 7 having a shield function will be then described hereinafter. As described previously, the concentration of Co in the first bottom core layer 7 is in the range of 78≦a≦82, and the range described above makes it possible to set the saturation magnetic flux density to 0.6 to 0.8 T, the coercive force (Hc) to 0.5 Oe and the resistivity (ρ) to 120 to 130 μΩ·cm along with adjusting the Curie temperature to 500° C. or less and the anisotropic magnetic field (Hk) to 1 to 5 Oe, although an anisotropic magnetic field (Hk) of 2 to 3 Oe being preferable in the present invention. The magnetic permeability (μ) at a frequency of 10 MHz is adjustable to 3000 or more.

The Co concentration of 78 at. % or less is not preferable since the proportion of Co making a contact with each other is reduced to hardly exhibit a ferromagnetic characteristic. The Co concentration of 82 at. % or more is also not preferable because the magnetic permeability (μ) is decreased.

The reason why the magnetic permeability (μ) is decreased at a high concentration of Co will be described below.

The high Co concentration makes the anisotropic magnetic field (Hk) (see FIG. 5) at the time of deposition (before heat treatment) high along with increasing the Curie temperature (Tc) (see FIG. 6).

When the Co concentration is 82 at. % or more, the anisotropic magnetic field (Hk) and the Curie temperature (Tc) are increased to about 11 Oe or more and 500° C. or more, respectively.

The anisotropic magnetic field (Hk) is gradually decreased by heating as described above, reaching to zero at the Curie temperature.

However, when the Curie temperature is too high, the anisotropic magnetic field (Hk) is hardly decreased at the heat treatment temperature (200° C. to 400° C.) according to the present invention, resulting in a high anisotropic magnetic field (Hk) of the first bottom core layer 7.

The magnetic permeability (μ) is decreased when the anisotropic magnetic field (Hk) is high, because there is a relation between the magnetic permeability (μ) and anisotropic magnetic field (Hk) represented by [magnetic permeability (μ)=saturation magnetic flux density (Bs)/anisotropic magnetic field (Hk)]. The higher the anisotropic magnetic field (Hk) is, the more the magnetic permeability (μ) is decreased.

Since the first bottom core layer 7 serves as a shield, it is inevitable that the magnetic permeability (μ) is high for improving the shield function. Accordingly, it is preferable that the anisotropic magnetic field (Hk) of the first bottom core layer 7 is as low as possible.

However, it is not preferable that the anisotropic magnetic field (Hk) is reduced to 1 Oe or less, because too small anisotropic magnetic field (Hk) makes the magnetic permeability ($\mu$) at high frequency bands to be rapidly decreased. Since the anisotropic magnetic field of 1 Oe or less is considered to be substantially isotropic, it is impossible to align the magnetization along the track width direction even after annealing in the magnetic field. Accordingly, the domain structure becomes unstable, thereby deteriorating the shield function. An adverse effect of generation of noises to the MR element that is responsible for regeneration of signals is also caused.

Magnetization of the first bottom core layer 7 is favorably aligned along the track width direction by being influenced by the strong anisotropic magnetic field (Hk) of the second bottom core layer 8 owing to annealing in the magnetic field when the anisotropic magnetic field (Hk) is a proper level. Accordingly, it is possible to improve the shield function by stabilizing the magnetic domain structure.

The Zr concentration (at. %) of the first bottom core layer 8 (the same in the second bottom core layer) is in the range of b=(0.5 to 0.8)×(100−a). When the Zr concentration is within this range, the magnetostriction constant ($\lambda$) can be adjusted to $5 \times 10^{-7}$ or less in its absolute value as shown in TABLE 2. The preferable composition range of the composition ratio b is represented by b=(0.6 to 0.7)×(100−a), and the composition within this range enables the magnetostriction constant ($\lambda$) to be $3 \times 10^{-7}$ or less in its absolute value.

While the first bottom core layer 7 according to the present invention serves as a shield layer to protect the magnetoresistive element layer 3 from excessive signals, it is possible in the present invention to improve the shielding function of the first bottom core layer 7 because the magnetic permeability ($\mu$) can be high while lowering the magnetostriction constant ($\lambda$) of the first bottom core layer 7 as described previously.

The first bottom core layer 7 and the second bottom core layer 8 can be formed by the following method.

Firstly, the first bottom core layer 7 is formed by depositing a soft magnetic film containing Co as a principal component and mainly composed of an amorphous structure by a sputtering method or deposition method after forming the top gap layer 6 shown in FIG. 6.

The sputtering methods used include a RF conventional sputtering, DC sputtering, magnetron sputtering, three-pole sputtering, ion-beam sputtering and confronting target sputtering.

A soft magnetic film mainly composed of an amorphous structure having a higher Co concentration than the Co concentration of the first bottom core layer 7 is further deposited on the first bottom core layer 7, thus forming the second bottom core layer 8.

The deposition process of the first bottom core layer 7 and second bottom core layer 8 may be carried out by applying a magnetic field along the track width direction, allowing magnetization of the second bottom core layer 8 having a high anisotropic magnetic field to be aligned along the track with direction to set the direction of the recording magnetic field toward the recording medium to be a hard axis of magnetization. Magnetization of the first bottom core layer 7 can be also favorably aligned along the track width direction by being influences by the high anisotropic magnetic field (Hk) of the second bottom core layer 8, although the anisotropic magnetic field (Hk) of the former is low.

In the next step, an annealing in the magnetic field is applied after the deposition. The heat treatment temperature of the annealing treatment according to the present invention is within the range of 200° C. to 400° C.

When the heat treatment temperature is 200° C. or less, the anisotropic magnetic field (Hk) of the first bottom core layer 7 becomes so high that the magnetic permeability ($\mu$) of the first bottom core layer 7 is decreased.

When the heat treatment temperature is 400° C. or more, on the other hand, the reproduction characteristic is deteriorated due to heat diffusion of the magnetoresistive element layer 3. The anisotropic magnetic field (Hk) of the first bottom core layer 7 is decreased to 1 Oe or less, causing a problem that the magnetic permeability ($\mu$) at high frequency bands is rapidly decreased.

A heat treatment temperature range of 200° C. to 400° C. makes it possible to adjust the anisotropic magnetic field (Hk) of the first bottom core layer 7 to 1 to 5 Oe, preferably to 2 to 3 Oe. Appropriately lowering the anisotropic magnetic field (Hk) of the first bottom core layer 7 allows the magnetic permeability ($\mu$) of the first bottom core layer 7 to be high, along with adjusting the anisotropic magnetic field (Hk) of the second bottom core layer 8 to 10 Oe or more.

The annealing process according to the present invention is carried out by applying a magnetic field along the direction parallel to the track width direction, enabling to favorably align the magnetization of the second bottom core layer 8 having a high anisotropic magnetic field (Hk) along the track width direction. Accordingly, the magnetic domain structure of the second bottom core layer 8 is stabilized to obtain a satisfactory inversion of magnetization during recording, thus improving the core function.

Magnetization of the first bottom core layer 7 is favorably aligned along the track width direction by being influenced by the strong anisotropic magnetization (Hk) of the second bottom core layer 8, though the first bottom core layer 7 has a low anisotropic magnetization (Hk). Accordingly, the magnetization structure of the first bottom core layer 7 is stabilized and it is made possible to improve the shield function.

Both of the shield function and core function are simultaneously improved in the present invention because the bottom core layer that has been formed into a single layer is formed into a double-layer, endowing the first bottom core layer 7 confronting the magnetoresistive element layer 3 with a shield function and the second bottom core layer 8 confronting the top core layer 11 with a core function.

A soft magnetic film containing Co as a principal component and mainly composed of an amorphous structure is used in the present invention instead of the Ni—Fe alloy that has been used for the bottom core layer, wherein the Co concentration of the second bottom core layer 8 is especially made higher than the Co concentration of the first bottom core layer 7.

Actually, the Co concentration of the second bottom core layer 8 is 85 to 91 at. % while the Co concentration of the first bottom core layer 7 is 78 to 82 at. %, which enables to make the saturation magnetic flux density and resistivity of the second bottom core layer 8 high thus improving the core function of the second bottom core layer. Increasing the magnetic permeability of the first bottom core layer 7 as well as favorably adjusting the composition ratio of the additional elements (Zr, Nb) other than Co enables the magnetostriction constant to be low, thus improving the shield function of the first bottom core layer.

When the soft magnetic film mainly composed of an amorphous structure with a high concentration of Co to be used for the second bottom core layer 8 is also used in the top core layer 11, the core function of the top core layer 11 can be also improved.

EXAMPLES

After depositing a plurality of Co—Zr—Nb alloys with a different Co concentration on the Si substrate, the saturation magnetic flux density (Bs), resistivity (ρ), coercive force (Hc), anisotropic magnetic field (Hk) and Curie temperature (Tc) of each sample were measured in the present invention. The experimental results are shown in FIG. 3 to FIG. 6.

In deposition described above, sputtering was carried out with a RF conventional sputtering apparatus in an Ar gas atmosphere by applying a magnetic field using a combined target of Co target in which Zr and Nb pellets are disposed.

Figure 3:
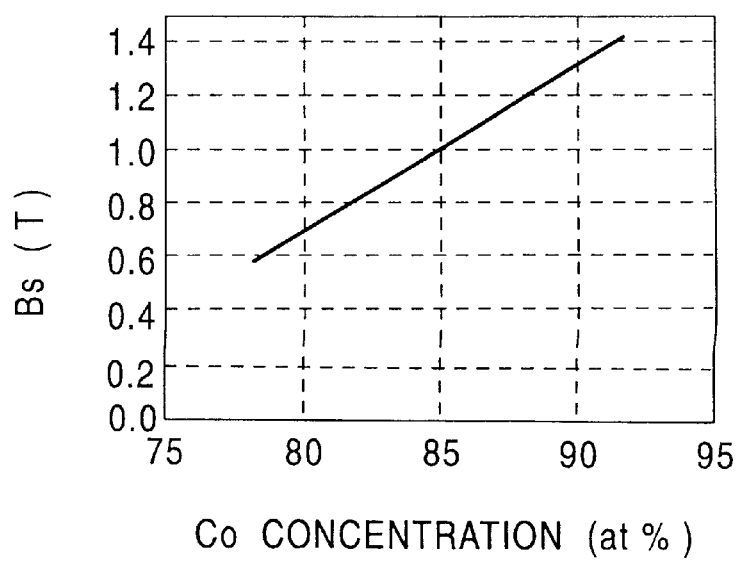
FIG. 3 is a graph indicating the relation between the Co concentration (% by atomic ratio; at. %) and saturation magnetic flux density (Bs).

FIG. 3 is a graph showing the relation between the Co concentration (at. %) and saturation magnetic flux density (Bs). As shown in the graph, the saturation magnetic flux density (Bs) is linearly increased as the Co concentration becomes higher.

As described previously, with reference to the Co concentration of 78 to 82 at. % of the first bottom core layer 7 shown in FIG. 1, it is evident from FIG. 3 that the saturation magnetic flux density (Bs) of the first bottom core layer 7 is about 0.6 to 0.8 T.

Likewise, it is evident from FIG. 3 that the saturation magnetic flux density (Bs) of the second bottom core layer 8 is about 1.0 to 1.4 T with reference to the Co concentration of 85 to 91 at. % of the second bottom core layer 8 shown in FIG. 1.

Making the Co concentration of the second bottom core layer 8 higher than the Co concentration of the first bottom core layer 7 allows the saturation magnetic flux density (Bs) of the second bottom core layer 8 to be higher than the saturation magnetic flux density (Bs) of the first bottom core layer 7.

Figure 10:
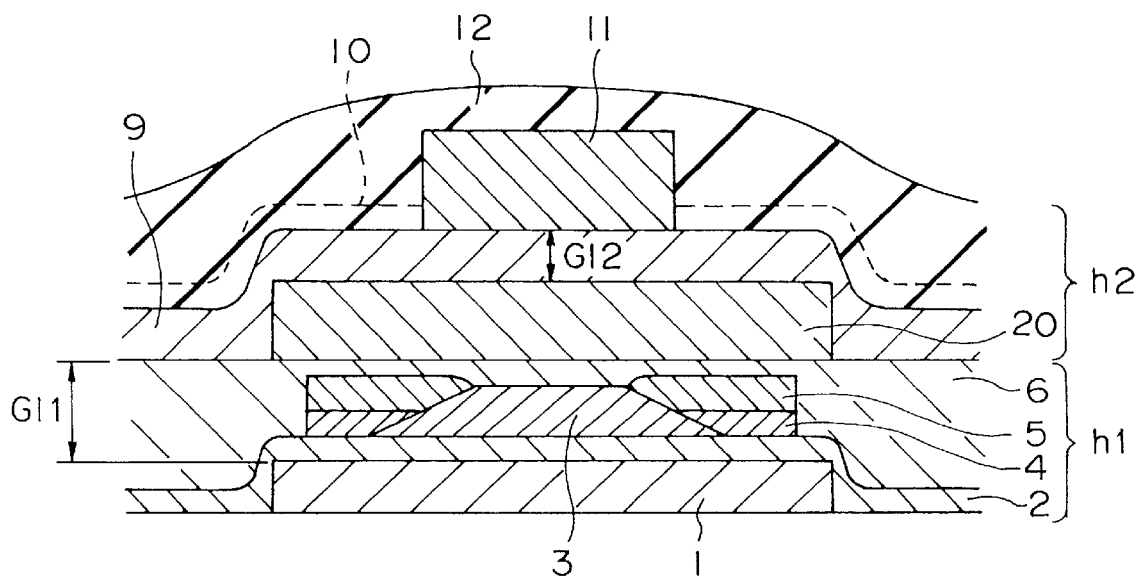
FIG. 10 is an enlarged cross section showing the construction of the conventional thin film magnetic head.

Because it is possible for the saturation magnetic flux density (1.0 to 1.4 T) of the second bottom core layer 8 to be higher than the saturation magnetic flux density (1.0 T; refer to TABLE 1 and TABLE 2) of the Ni—Fe alloy shown in FIG. 10, magnetization is made to be hardly saturated as compared with the conventional art.

Figure 4:
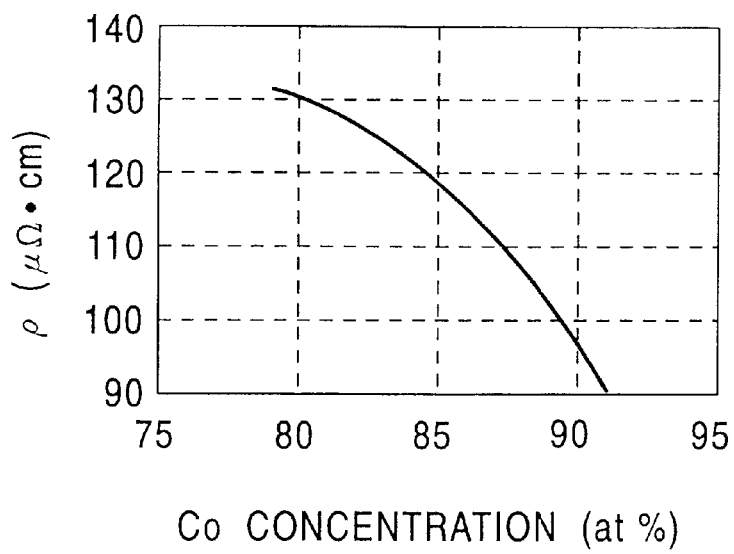
FIG. 4 is a graph showing the relation between the Co concentration (at. %) and resistivity (ρ).

FIG. 4 is a graph showing the relation between the Co concentration (at. %) and resistivity (ρ).

As shown in FIG. 4, the resistivity (ρ) is lowered as the Co concentration (at. %) is higher.

The resistivity (ρ) of the first bottom core layer 7 with a Co concentration of 78 to 82 at. % is determined to be about 120 μΩ·cm or more referring to FIG. 4.

The resistivity (ρ) of the second bottom core layer 8 with a Co concentration of 85 to 91 at. % is estimated to be about 90 to 120 μΩ·cm referring to FIG. 4.

On the contrary, the resistivity of the Ni—Fe alloy is about 18 μΩ·cm (refer to TABLE 1 and TABLE 2). Therefore, it is concluded that the resistivity (ρ) of the first bottom core layer 7 and the second bottom core layer 8 can be made higher in the present invention than in the prior art thereby diminishing the eddy current los at high frequency bands. Especially, enhancing the resistivity (ρ) of the second bottom core layer 8 that serves as a core makes it possible to decrease the eddy current loss along with depressing phase retardation (NLTS; non-linear transition shift) of the recording signal due to the eddy current.

FIG. 5 is a graph showing the relation between the Co concentration (at. %), and coercive force (Hc) and anisotropic magnetic field (Hk). No heat treatment was applied after deposition for this measurement.

FIG. 5 shows that the higher the Co concentration (at. %) is, the higher become the coercive force (Hc) and anisotropic magnetic field (Hk).

It is evident that the coercive force (Hc) is 0.5 Oe or less in both the first bottom core layer 7 (Co concentration: 78 to 82 at. %) and second bottom core layer 8 (Co concentration: 85 to 91 at. %).

It is also evident that the anisotropic magnetic field (Hk) is about 10 to 12 Oe in both the first bottom core layer 7 (Co concentration: 78 to 82 at. %) while the anisotropic magnetic field (Hk) is about 12.5 to 15 Oe in the second bottom core layer 8 (Co concentration: 85 to 91 at. %).

FIG. 6 is a graph showing the relation between the Co concentration (at. %) and Curie temperature (Tc).

As shown in FIG. 6, the higher the Co concentration (at. %) is, the higher becomes the Curie temperature.

It is possible in the present invention to set the Curie temperature (Tc) of the first bottom core layer 7 (Co concentration: 78 to 82 at. %) to be 500° C. or less and the Curie temperature (Tc) of the second bottom core layer 8 (Co concentration: 85 to 91 at. %) to be 600° C. or more.

The anisotropic magnetic field (Hk) of the soft magnetic film is reduced to zero when a heat treatment is applied to the film at a temperature of higher than the Curie temperature. In other words, while the first bottom core layer that has not been subjected to a heat treatment has an anisotropic magnetic field (Hk) of 10 Oe or more, the anisotropic magnetic field (Hk) of the first bottom core layer 7 is reduced to zero when an annealing treatment is applied to the first bottom core layer 7 at a temperature of 500° C. or more as described previously.

Likewise, while the second bottom core layer 8 not subjected to a heat treatment has an anisotropic magnetic field (Hk) of 12.5 Oe or more, the anisotropic magnetic field (Hk) of the second bottom core layer 8 is reduced to zero when an annealing treatment is applied to the second bottom core layer 8 at a temperature of 500° C. or more.

A plurality of Co—Zr—Nb alloys having different ratios between the Zr concentration and Nb concentration were then deposited in the present invention to measure the magnetostriction constant (λ) of each sample. The experimental results are shown in FIG. 7.

Figure 7:
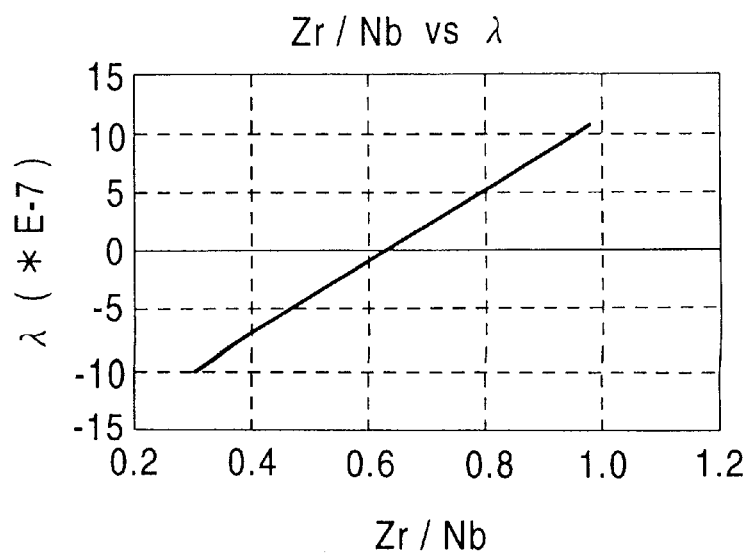
FIG. 7 is a graph showing the relation between Zr/Nb ratio and magnetostriction constant (λ).

As shown in FIG. 7, the magnetostriction constant (λ) linearly varies against the Zr/Nb ratio, the magnetostriction constant (λ) being a negative value when the Zr/Nb ratio is about 0.62 or less and the magnetostriction constant (λ) being a positive value when the Zr/Nb ratio is about 0.62 or more. In other words, the magnetostriction constant (λ) is adjusted to a positive value as the amount of addition of Zr is increased or, inversely, the magnetostriction constant (λ) is adjusted to a negative value as the amount of addition of Nb is increased. This fact suggests that Zr has a function to set the magnetostriction constant to a positive value while Nb has a function to set the magnetostriction constant to a negative value.

It is preferable in the present invention that the magnetostriction constant (λ) is as mall as possible. A low level of the magnetostriction constant (λ) is an essential condition (see TABLE 1) especially for the shield function to stabilize the magnetic domain structure.

While the magnetostriction constant (λ) of the Ni—Fe alloy conventionally used for the bottom core layer is relatively as low as about $0.5 \times 10^{-7}$ (see TABLE 1 and TABLE 2), the Zr/Nb ratio is determined so that the magnetostriction constant (λ) becomes lower than the level described above.

It can be understood from FIG. 7 that the Zr/Nb ratio should be 0.5≦Zr/Nb≦0.8 in order to adjust the magnetostriction constant (λ) blow $5\times10^{-7}$ in the absolute value. In other words, the magnetostriction constant (λ) can be made to be $5\times10^{-7}$ or less in the absolute value when the equation of b=(0.5 to 0.8)×(100−a) is satisfied (wherein the composition ratio of Zr is represented by b (at. %)).

It is preferable in the present invention that the magnetostriction constant (λ) is $3\times10^{-7}$ or less in the absolute value. As is evident from FIG. 7, the Zr/Nb ratio should be 0.6 to 0.7, or the composition ratio b (at. %) of Zr should satisfy the equation of b=(0.6 to 0.7)×(100−a) for the purpose described above.

Figure 8:
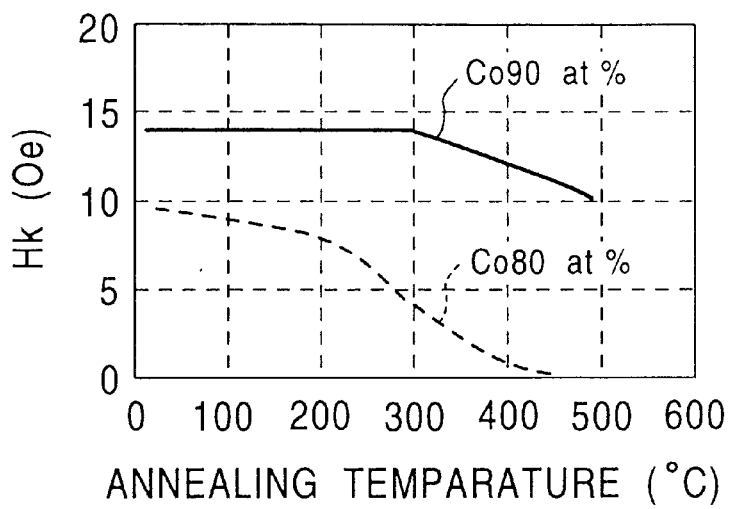
FIG. 8 is a graph showing the relation between the annealing temperature (°C.) and anisotropic magnetic field (Hk).

An annealing treatment was applied using two kinds of samples of a Co—Zr—Nb alloy with a Co concentration of 80 at. % and a Co—Zr—Nb alloy with a Co concentration of 90 at. %, followed by measurements of the relation between the annealing temperature and anisotropic magnetic field (Hk). The experimental results are shown in FIG. 8.

The anisotropic magnetic field (Hk) is decreased with the increase of the annealing treatment temperature in both the soft magnetic film with a Co concentration of 80 at. % and the soft magnetic film with a Co concentration of 90 at. %. Especially in the soft magnetic film with a Co concentration of 80 at. %, the anisotropic magnetic field (Hk) starts to be rapidly decreased at an annealing temperature of 250° C. or more.

The fact described above has a close relation with the Curie temperature (Tc) shown in FIG. 6.

When the Co concentration is 80 at. %, the Curie temperature (Tc) is about 400° C. as seen in FIG. 6. When the Co concentration is 90 at. %, the Curie temperature (Tc) becomes 800° C. or more.

When the annealing temperature reaches to the Curie temperature (Tc), the anisotropic magnetic field is reduced to zero.

In other words, while the anisotropic magnetic field (Hk) at the time of deposition exhibits a high value of about 11 Oe in the soft magnetic film with a Co concentration of 80 at. % as shown in FIG. 5, the anisotropic magnetic field (Hk) gradually decreases following the curve shown in FIG. 8 by applying an annealing treatment. When the annealing treatment is applied at about 400° C., the anisotropic magnetic field (Hk) is reduced to approximately zero as shown in FIG. 8.

On the other hand, the anisotropic magnetic field (Hk) is not so decreased at an annealing temperature of 400° C. in the soft magnetic film with a Co concentration of 90 at. % since its Curie temperature (Tc) is 800° C. or more, maintaining an anisotropic magnetic field of 10 Oe or more.

The reason why the range of the annealing temperature is determined to be 200° C. to 400° C. in the present invention will be described hereinafter.

It is not preferable that the temperature exceeds 400° C. since the magnetoresistive element layer 3 shown in FIG. 1 is adversely affected to deteriorate the reproduction characteristic.

The anisotropic magnetic field (Hk) of the first bottom core layer 7 that serves as a shield is preferably 1 to 5 Oe, more preferably 2 to 3 Oe, after the annealing treatment.

Not so high anisotropic magnetic field (Hk) is required for shielding, because too high anisotropic magnetic field allows the magnetic permeability (μ) to be decreased. However, decreasing the anisotropic magnetic field (Hk) blow 1 Oe is not preferable since the first bottom core layer 7 becomes magnetically isotropic.

The Co concentration of the first bottom core layer 7 is 78 to 82 at. % in the present invention. However, when Co is added up to its maximum concentration of 82 at. %, the Curie temperature (Tc) becomes about 500° C., enabling to obtain an anisotropic magnetic field of at least 1 Oe even when the annealing temperature reaches to about 400° C. (see FIG. 8).

It can be understood from FIG. 6 that the Curie temperature is decreased to about 300° C. when Co is added to its minimum concentration of 78 at. %. Consequently, the anisotropic magnetic field (Hk) is reduced to 5 Oe or less at an annealing temperature of about 200° C.

The anisotropic magnetic field (Hk) is increased to 5 Oe or more at an annealing temperature of 200° C. or less even when Co is added to its minimum concentration of 78 at. %, being not preferable since the magnetic permeability is decreased.

As hitherto described, it is possible to adjust the anisotropic magnetic field (Hk) of the first bottom core layer 7 with a Co concentration of 78 to 82 at. % to at least 1 to 5 Oe by favorably adjusting the annealing temperature in the range of 200° C. to 400° C.

It is preferable that the anisotropic magnetic field is high in the second bottom core layer 8 that serves as a core.

The Co concentration of the second bottom core layer 8 is 85 to 91 at. %. It can be understood from FIG. 8 (a graph with a Co concentration of 90 at. %) that an anisotropic magnetic field (Hk) of 10 Oe or more can be obtained in the annealing temperature range of 200° C. to 400° C. when Co is added up to its maximum concentration of 91 at. %.

While the Curie temperature becomes about 600° C. as shown in FIG. 6 when Co is added in its lower limit of 85 at. %, an anisotropic magnetic field (Hk) of 10 Oe or more can be obtained when the annealing temperature is adjusted within the range of 200° C. to 400° C.

It is concluded from the foregoing discussions that an anisotropic magnetic field (Hk) of 10 Oe or more can be always obtained when the annealing temperature is adjusted within the range of 200° C. to 400° C.

The magnetic permeability (μ) was measured after annealing a plurality of samples with different Co concentrations at 300° C. The experimental results are shown in FIG. 9.

Figure 9:
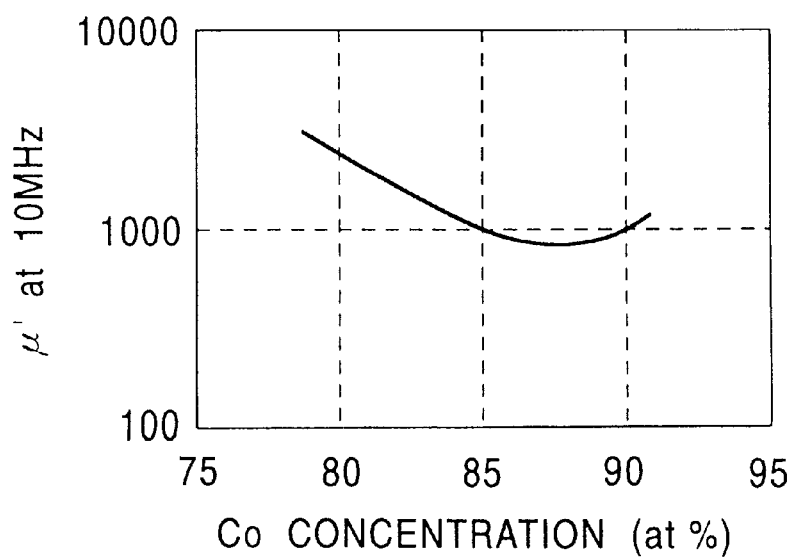
FIG. 9 is a graph showing the relation between the Co concentration and magnetic permeability (μ) at 10 MHz.

It is evident from FIG. 9 that the magnetic permeability (μ) is decreased in the Co concentration range of 78 at. % to 87 at. %. This is because the anisotropic magnetic field (Hk) is enhanced as the Co concentration is increased.

The following equation is valid between the magnetic permeability (μ) and anisotropic magnetic field (Hk):

magnetic permeability (μ)=saturation magnetic flux density (Bs)/anisotropic magnetic field (Hk)

This means that the magnetic permeability (μ) is lowered with the increase of the anisotropic magnetic field (Hk).

It is possible in the present invention to adjust the magnetic permeability (μ) of the first bottom core layer 7 to 3000 or more as is evident from FIG. 9 since the Co concentration of the first bottom core layer 7 that serves as a shield is in the range of 78 to 82 at. %.

As shown in FIG. 9, the magnetic permeability (μ) starts to increase when the Co concentration is increased to 87 at. % or more. This is supposed that, while the anisotropic magnetic field (Hk) becomes high besides the saturation magnetic flux density (Bs) is increased when the Co concentration is increased (see FIG. 3), the increasing ratio of the saturation magnetic flux density is especially dominant to the increasing ratio of the anisotropic magnetic field (Hk). Accordingly, the magnetic permeability ($\mu$) represented by [magnetic flux density (Bs)/anisotropic magnetic field (Hk)] also begins to be increased.

Since the Co concentration of the second bottom core layer 8 that serves as a core is 85 to 91 at. % in the present invention, it is possible to adjust the magnetic permeability of the second bottom core layer 8 to be about 1000.

According to the present invention hitherto described, it is possible to simultaneously improve the core function and shield function by constructing the bottom core layer that serves as both the core function and shield function to be a double-layer structure, by allowing the bottom core layer at the side confronting the top core layer to have a core function, and by allowing the bottom core layer at the side confronting to the magnetoresistive element layer to have a shield function.

The bottom core layer contains Co as a principal component and is mainly composed of an amorphous structure. In addition, the Co concentration of the bottom core layer at the side confronting the top core layer is made higher than the Co concentration of the bottom core layer at the side confronting the magnetoresistive element layer, thereby making it possible to obtain magnetic characteristics required for respective layers.

Actually, a saturation magnetic flux density of 1.0 T or more, a resistivity of 90 $\mu\Omega\cdot$cm or more and an anisotropic magnetic field of 10 Oe or more can be obtained by adjusting the Co concentration of the bottom core layer at the side confronting the top core layer to 85 to 91 at. %, thereby enabling to improve the core function of the bottom core layer.

A magnetic permeability of 3000 or more and a resistivity of 120 $\mu\Omega\cdot$cm or more is obtained by adjusting the Co concentration of the bottom core layer at the side confronting the magnetoresistive element layer to 78 to 82 at. %. Furthermore, the absolute value of the magnetostriction constant can be adjusted to $3\times10^{-7}$ or less by properly adjusting the composition ratio between Zr and Nb as additive elements, thereby enabling the shield function of the bottom core layer to be improved.

What is claimed are:

1. A thin film magnetic head comprising:

a magnetoresistive element layer;

an electrode layer to impart a sensing current to the magnetoresistive element layer;

a bottom core layer formed on the electrode layer via an insulation layer, the bottom core layer additionally being a top shield layer of a reading head;

a top core layer confronting the bottom core layer at a confronting part of a recording medium via a magnetic gap; and a coil layer to impart a magnetic field to both core layers, said bottom core layer having a double-layer structure of soft magnetic films containing Co as a principal component and mainly composed of an amorphous structure with a composition formula of $Co_aZr_bNb_c$, an upper side of the bottom core layer confronting the top core layer containing a higher concentration of Co than a lower side of the bottom core layer confronting the magnetoresistive element layer, wherein composition ratio a is in the range of $85 \leq a \leq 91$ for the upper side bottom core layer, wherein composition ratio a is in the range of $78 \leq a \leq 82$ for the lower side bottom core layer, and wherein composition ratios b and c are represented by;
b=(0.5 to 0.8)×(100−a) and
c=100−a−b in both of the upper side bottom core layer and lower side bottom core layer.

2. A thin film magnetic head according to claim 1, wherein absolute values of magnetostriction constants ($\lambda$) of the upper side bottom core layer and lower side bottom core layer are not greater than $3\times10^{-7}$.

3. A thin film magnetic head according to claim 1, wherein a film thickness of the entire bottom core layer, being a sum of a film thickness of the lower side bottom core layer and a film thickness of the upper side bottom core layer, is in the range of 1 to 4 $\mu$m.

4. A thin film magnetic head according to claim 1, wherein a film thickness of the upper side bottom core layer occupies 50% to 90% of a film thickness of the entire bottom core layer.

5. A thin film magnetic head according to claim 1, wherein magnetization of the upper side bottom core layer and lower side bottom core layer are aligned along a track width direction, a direction of the recording magnetic field toward the recording medium and a direction of the external magnetic field from the recording medium being made to be a hard axis of magnetization.

6. A thin film magnetic head according to claim 1, wherein the composition ratio b is represented by b=(0.6 to 0.7)×(100−a).

7. A thin film magnetic head according to claim 1, wherein Hf is added instead of the element Zr constituting the soft magnetic film.

8. A thin film magnetic head according to claim 1, wherein one of Ta and Mo is added instead of the element Nb constituting the soft magnetic film.

9. A thin film magnetic head according to claim 1, wherein a saturation magnetic flux density (Bs) of the upper side bottom core layer is in the range of 1.0 to 1.4 T (tesla).

10. A thin film magnetic head according to claim 1, wherein a resistivity ($\rho$) of the upper side bottom core layer is not less than 90 $\mu\Omega\cdot$cm.

11. A thin film magnetic head according to claim 1, wherein an anisotropic magnetic field of the upper side bottom core layer is not less than 10 Oe (oersted).

12. A thin film magnetic head according to claim 1, wherein a saturation magnetic flux density (Bs) of the lower side bottom core layer is in the range of 0.6 to 0.8 T.

13. A thin film magnetic head according to claim 1, wherein a resistivity ($\rho$) of the lower side bottom core layer is not less than 120 $\mu\Omega$cm.

14. A thin film magnetic head according to claim 1, wherein a Curie temperature (Tc) of the lower side bottom core layer is not greater than 500° C.

15. A thin film magnetic head according to claim 1, wherein an anisotropic magnetic field (Hk) of the lower side bottom core layer is in the range of 1 to 5 Oe.

16. A thin film magnetic head according to claim 1, wherein an anisotropic magnetic field (Hk) of the lower side bottom core layer is in the range of 2 to 3 Oe.

17. A thin film magnetic head according to claim 1, wherein a magnetic permeability ($\mu$) of the lower side bottom core layer is not less than 3000.

18. A thin film magnetic head according to claim 1, wherein an absolute value of a magnetostriction constant ($\lambda$) of the lower side bottom core layer is not greater than $5\times10^{-7}$.

19. A thin film magnetic head according to claim 1, wherein an absolute value of a magnetostriction constant (λ) of the upper side bottom core layer is not greater than $3 \times 10^{-7}$.

20. A thin film magnetic head according to claim 6, wherein Hf is added instead of the element Zr constituting the soft magnetic film.

21. A thin film magnetic head according to claim 6, wherein one of Ta and Mo is added instead of the element Nb constituting the soft magnetic film.

22. A thin film magnetic head according to claim 6, wherein a saturation magnetic flux density (Bs) of the upper side bottom core layer is in the range of 1.0 to 1.4 T (tesla).

23. A thin film magnetic head according to claim 6, wherein a resistivity (ρ) of the upper side bottom core layer is not less than 90 μΩ·cm.

24. A thin film magnetic head according to claim 6, wherein an anisotropic magnetic field (Hk) of the upper side bottom core layer is in the range of not less than 10 Oe.

25. A thin film magnetic head according to claim 6, wherein a saturation magnetic flux density (Bs) of the lower side bottom core layer is in the range of 0.6 to 0.8 T.

26. A thin film magnetic head according to claim 6, wherein a resistivity (ρ) of the lower side bottom core layer is not less than 120 μΩ·cm.

27. A thin film magnetic head according to claim 6, wherein a Curie temperature (Tc) of the lower side bottom core layer is not greater than 500° C.

28. A thin film magnetic head according to claim 6, wherein an anisotropic magnetic field (Hk) of the lower side bottom core layer is in the range of 1 to 5 Oe.

29. A thin film magnetic head according to claim 6, wherein an anisotropic magnetic field (Hk) of the lower side bottom core layer is in the range of 2 to 3 Oe.

30. A thin film magnetic head according to claim 6, wherein a magnetic permeability (μ) of the lower side bottom core layer is not less than 3000.

31. A thin film magnetic head according to claim 6, wherein absolute values of magnetostriction constants (λ) of the upper side bottom core layer and lower side bottom core layer are not greater than $5 \times 10^{-7}$.

32. A thin film magnetic head according to claim 6, wherein absolute values of magnetostriction constants (λ) of the upper side bottom core layer and lower side bottom core layer are not greater than $3 \times 10^{-7}$.

33. A thin film magnetic head according to claim 6, wherein a film thickness of the entire bottom core layer, being a sum of a film thickness of the lower side bottom core layer and a film thickness of the upper side bottom core layers is in the range of 1 to 4 μm.

34. A thin film magnetic head according to claim 6, wherein a film thickness of the upper side bottom core layer occupies 50% to 90% of a film thickness of the entire bottom core layer.

35. A thin film magnetic head according to claim 6, wherein magnetization of the upper side bottom core layer and lower side bottom core layer are aligned along a track width direction, a direction of the recording magnetic field toward the recording medium and a direction of the external magnetic field from the recording medium being made to be a hard axis of magnetization.

36. A thin film magnetic head according to claim 7, wherein one of Ta and Mo is added instead of the element Nb constituting the soft magnetic film.

37. A thin film magnetic head according to claim 7, wherein a saturation magnetic flux density (Bs) of the upper side bottom core layer is in the range of 1.0 to 1.4 T (tesla).

38. A thin film magnetic head according to claim 7, wherein a resistivity (ρ) of the upper side bottom core layer is not less than 90 μΩ·cm.

39. A thin film magnetic head according to claim 7, wherein an anisotropic magnetic field (Hk) of the upper side bottom core layer is not less than 10 Oe (oersted).

40. A thin film magnetic head according to claim 7, wherein a saturation magnetic flux density (Bs) of the lower side bottom core layer is in the range of 0.6 to 0.8 T.

41. A thin film magnetic head according to claim 7, wherein a resistivity (ρ) of the lower side bottom core layer is not less than 120 μΩcm.

42. A thin film magnetic head according to claim 7, wherein a Curie temperature (Tc) of the lower side bottom core layer is not greater than 500° C.

43. A thin film magnetic head according to claim 7, wherein an anisotropic magnetic field (Hk) of the lower side bottom core layer is in the range of 1 to 5 Oe.

44. A thin film magnetic head according to claim 7, wherein an anisotropic magnetic field (Hk) of the lower side bottom core layer is in the range of 2 to 3 Oe.

45. A thin film magnetic head according to claim 7, wherein a magnetic permeability (μ) of the lower side bottom core layer is not less than 3000.

46. A thin film magnetic head according to claim 7, wherein absolute values of magnetostriction constants (λ) of the upper side bottom core layer and lower side bottom core layer are not greater than $5 \times 10^{-7}$.

47. A thin film magnetic head according to claim 7, wherein absolute values of magnetostriction constants (λ) of the upper side bottom core layer and lower side bottom core layer are not greater than $3 \times 10^{-7}$.

48. A thin film magnetic head according to claim 7, wherein a film thickness of the entire bottom core layers being a sum of a film thickness of the lower side bottom core layer and a film thickness of the upper side bottom core layer, is in the range of 1 to 4 μm.

49. A thin film magnetic head according to claim 7, wherein a film thickness of the upper side bottom core layer occupies 50% to 90% of a film thickness of the entire bottom core layer.

50. A thin film magnetic head according to claim 7, wherein magnetization of the upper side bottom core layer and lower side bottom core layer are aligned along a track width direction, a direction of the recording magnetic field toward the recording medium and a direction of the external magnetic field from the recording medium being made to be a hard axis of magnetization.

51. A thin film magnetic head according to claim 8, wherein a saturation magnetic flux density (Bs) of the upper side bottom core layer is in the range of 1.0 to 1.4 T (tesla).

52. A thin film magnetic head according to claim 8, wherein a resistivity (ρ) of the upper side bottom core layer is not less than 90 μΩ·cm.

53. A thin film magnetic head according to claim 8, wherein an anisotropic magnetic field (Hk) of the upper side bottom core layer is not less than 10 Oe (oersted).

54. A thin film magnetic head according to claim 8, wherein a saturation magnetic flux density (Bs) of the lower side bottom core layer is in the range of 0.6 to 0.8 T.

55. A thin film magnetic head according to claim 8, wherein a resistivity (ρ) of the lower side bottom core layer is not less than 120 μΩ·cm.

56. A thin film magnetic head according to claim 8, wherein a Curie temperature (Tc) of the lower side bottom core layer is not greater than 500° C.

57. A thin film magnetic head according to claim 8, wherein an anisotropic magnetic field (Hk) of the lower side bottom core layer is in the range of 1 to 5 Oe.

58. A thin film magnetic head according to claim 8, wherein an anisotropic magnetic field (Hk) of the lower side bottom core layer is in the range of 2 to 3 Oe.

59. A thin film magnetic head according to claim 8, wherein a magnetic permeability ($\mu$) of the lower side bottom core layer is not less than 3000.

60. A thin film magnetic head according to claim 8, wherein absolute values of magnetostriction constants ($\lambda$) of the upper side bottom core layer and lower side bottom core layer are not greater than $5\times10^{-7}$.

61. A thin film magnetic head according to claim 8, wherein absolute values of magnetostriction constants ($\lambda$) of the upper side bottom core layer and lower side bottom core layer are not greater than $3\times10^{-7}$.

62. A thin film magnetic head according to claim 8, wherein a film thickness of the entire bottom core layers being a sum of a film thickness of the lower side bottom core layer and a film thickness of the upper side bottom core layer, is in the range of 1 to 4 $\mu$m.

63. A thin film magnetic head according to claim 8, wherein a film thickness of the upper side bottom core layer occupies 50% to 90% of a film thickness of the entire bottom core layer.

64. A thin film magnetic head according to claim 8, wherein magnetization of the upper side bottom core layer and lower side bottom core layer are aligned along a track width direction, a direction of the recording magnetic field toward the recording medium and a direction of the external magnetic field from the recording medium being made to be a hard axis of magnetization.

* * * * *

UNITED STATES PATENT AND TRADEMARK OFFICE
CERTIFICATE OF CORRECTION

PATENT NO. : 6,177,207 B1
DATED : January 23, 2001
INVENTOR(S) : Fumihito Koike

It is certified that error appears in the above-identified patent and that said Letters Patent is hereby corrected as shown below:

Claim 1,
Line 13, delete "principal" and substitute -- principle -- in its place.

Claim 33,
Line 5, delete "layers" and substitute -- layer, -- in its place.

Claim 48,
Line 2, delete "layers" and substitute -- layer, -- in its place.

Claim 62,
Line 2, delete "layers" and substitute -- layer, -- in its place.

Signed and Sealed this

Twenty-sixth Day of March, 2002

*Attest:*

*Attesting Officer*

JAMES E. ROGAN
*Director of the United States Patent and Trademark Office*